(No Model.) 2 Sheets—Sheet 1.

H. L. HOPPER, née SMITH.
APPARATUS FOR PREPARING CANNED FOOD.

No. 374,909. Patented Dec. 13, 1887.

WITNESSES
Phil C. Dieterich.
F. Ed. Turpin.

INVENTOR
Helen L. Smith
by James J. Sheehy
Attorney (No Model.) 2 Sheets—Sheet 2.
H. L. HOPPER, née SMITH.
APPARATUS FOR PREPARING CANNED FOOD.
No. 374,909. Patented Dec. 13, 1887.
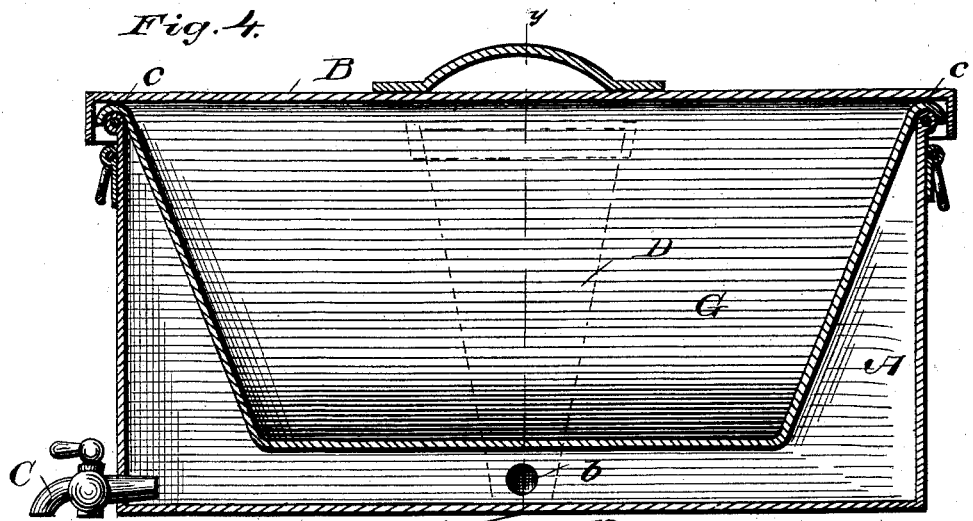
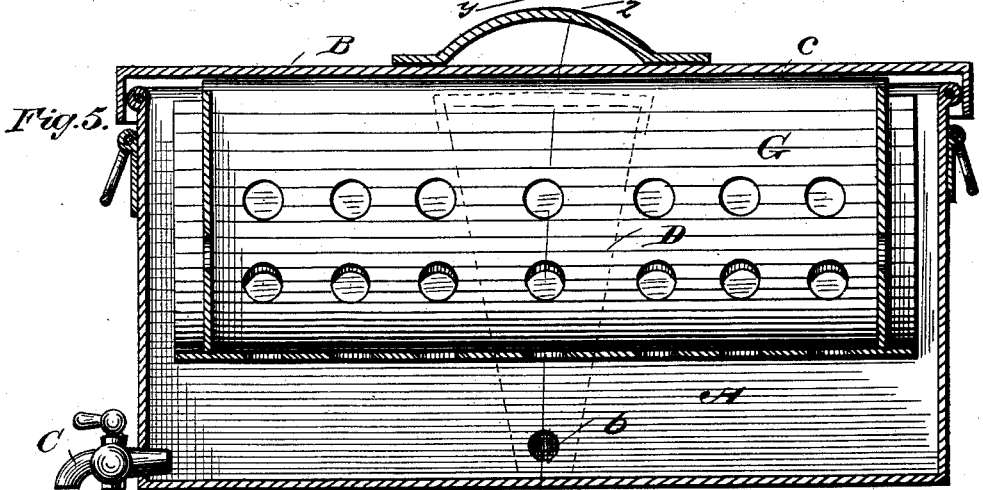
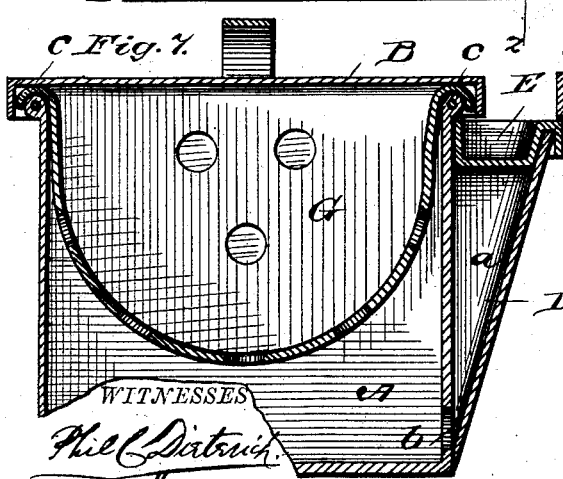
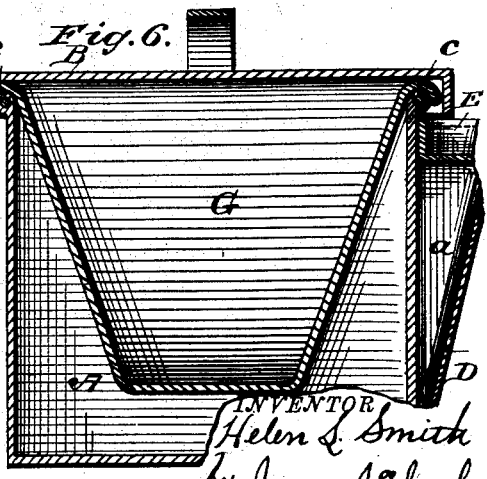
WITNESSES
Phil C. Dietrich
F. Ed. Turpin
INVENTOR
Helen L. Smith
by James J. Sheehy
Attorney

UNITED STATES PATENT OFFICE.

HELEN L. SMITH, (MARRIED, NOW HELEN L. HOPPER,) OF HUTCHINSON, KANSAS.

APPARATUS FOR PREPARING CANNED FOOD.

SPECIFICATION forming part of Letters Patent No. 374,909, dated December 13, 1887.

Application filed June 18, 1887. Serial No. 241,740. (No model.)

*To all whom it may concern:*

Be it known that I, HELEN L. SMITH, a citizen of the United States, residing at Hutchinson, in the county of Reno and State of Kansas, have invented certain new and useful Improvements in Apparatus for Preparing Canned Food; and I do declare the following to be a full, clear, and exact description of the invention, such as will enable others skilled in the art to which it appertains to make and use the same.

This invention relates to improvements in apparatuses for steaming fruit in cans and sustaining the cans in proper position in a steamer during the process of cementing the covers upon the cans, provision being made for keeping the wax or cement in a proper fluid state and in a convenient location on the steamer for use, all of which will be more fully understood from the following description, when taken in connection with the annexed drawings, in which—

Figure 1:
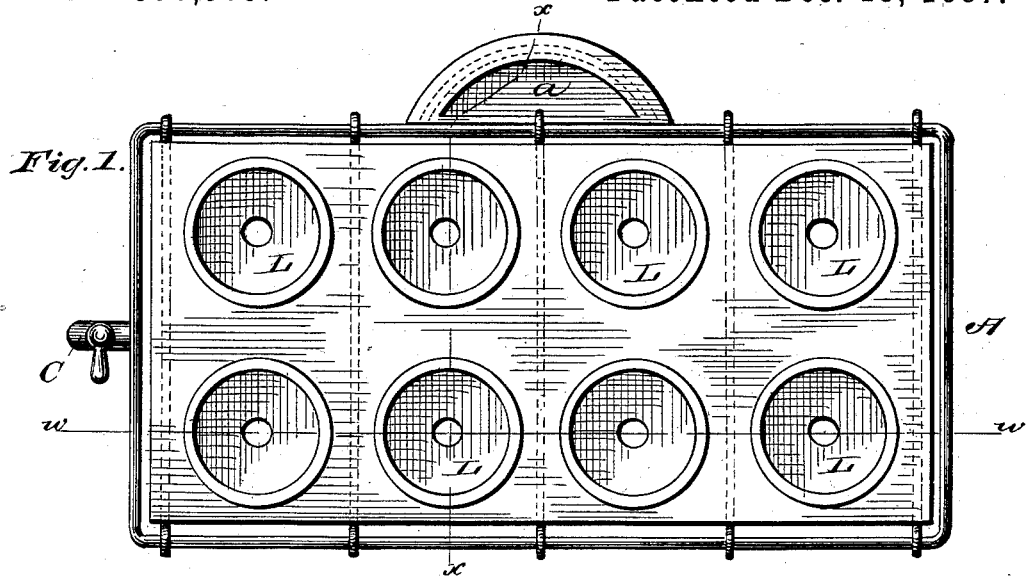
Figure 2:
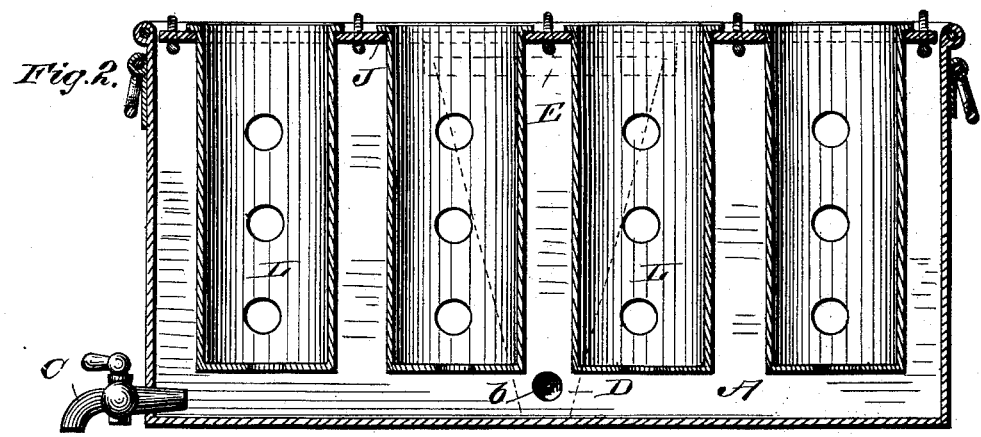
Figure 3:
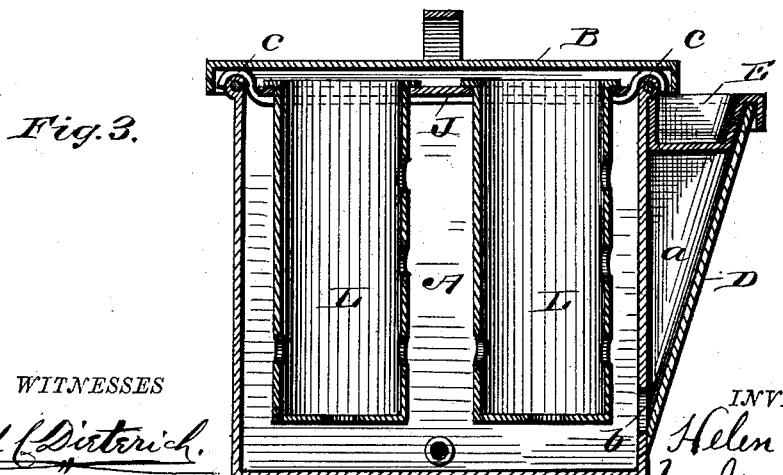

Figure 1 is a top view of my improved boiler or steamer, showing the perforated depending cells for supporting the fruit-cans upright while cementing the covers upon them. Fig. 2 is a vertical longitudinal section through Fig. 1, and the plane indicated by dotted lines *w w* on Fig. 1. Fig. 3 is a transverse section through Fig. 1, taken in the course of dotted line *x x* thereon. Fig. 4 is a vertical section longitudinally through the boiler, showing a pyramidal pan suspended therein and covered. Fig. 5 is a longitudinal section taken vertically through the covered boiler, showing a perforated concave bottom vessel suspended therein. Fig. 6 is a vertical cross-section through Fig. 4 in the plane indicated by dotted line *y y* thereon. Fig. 7 is a vertical cross-section through Fig. 5 in the plane indicated by line 2 2 thereon.

For the purpose of properly preserving fruit in cans it is necessary, after filling the cans, to subject them to a temperature at or below 212° Fahrenheit, for the purpose of driving out the air, and while the fruit is at this temperature to hermetically seal the covers on the cans.

My object is to provide simple means for doing this work expeditiously and efficiently.

Referring to the annexed drawings by letters, A designates an oblong rectangular vessel, which I denominate the "boiler" or "steamer," and which may be of any desired capacity, and preferably made of sheet metal.

B designates the cover of the boiler A, (shown in Figs. 4, 5, 6, and 7,) which cover is used while subjecting the fruit in cans to the boiling process. This boiler is provided with a cock, C, for drawing off the water when desired, and it is also provided with a tapered offset, D, forming an external supplemental chamber, *a*, outside of the main chamber, and communicating with the latter by means of an aperture, *b*. This offset is designed for supporting a removable flanged cup, E, for containing the cement used for sealing the covers upon the fruit-cans and keeping this cement in a fluid state.

It will be observed that, by reference to the annexed drawings, the top of the offset D is nearly on a level with the top of the boiler proper, hence the cement-cup E is in a position convenient for use.

Inside of the boiler A, and suspended by curved wings *c c*, hooking over the upper edges of the sides of said boiler, is a vessel, G, which is represented in Figs. 4 and 6, of the form of an inverted pyramid, or having downwardly-tapered sides and ends which are not perforated. This vessel (shown in Fig. 4) is used for cleaning purposes generally, and it is removable from the boiler. The vessel G (represented in Figs. 5 and 7) is numerously perforated and has a concavo-convex bottom, designed to admit steam generated in the boiler A for the purpose of rapidly heating the fruit in the cans to the proper temperature for driving off the air before sealing the covers on the cans.

While sealing on the covers two things are essential, first, that the proper temperature of the fruit should be maintained, and, second, that the cans be firmly supported in vertical positions. This I accomplish by the following means, reference being had to Figs. 1, 2, and 3 of the annexed drawings:

J designates a horizontal cover or support which is removably applied just inside of the top of the boiler A, and suspended therein by hooks engaging with the upper edges of this boiler. This cover J has a number of apertures through it, preferably arranged as shown in the plan view Fig. 1, through which are passed perforated cups L, which are suspended by their flanged upper ends from said cover. These cups L are of such diameter and length that they are adapted to receive within them the fruit-cans and to support them in vertical positions. The cans having been adjusted in said cups, they will be subjected to the steam generated in the boiler A, which will keep the fruit at the proper temperature. This steam will also keep the cement put in the cup E in a fluid state.

It will thus be seen that with my improved apparatus the work of expelling the air from filled cans of fruit and sealing on the covers can be rapidly and conveniently performed.

It is obvious that one boiler A may be used for the different removable vessels.

Having described my invention, what I desire to secure by Letters Patent is—

1. The combination, with the boiler or steamer, of the offset chamber commencing with the interior of the said boiler, and a cement-holding cup, serving the additional function of a cover for this chamber, substantially as specified.

2. In an apparatus for canning fruit, the combination of a boiler or steamer provided with an offset chamber communicating with the interior of said boiler, a cement-holding cup at the top of this chamber, a cover suspended in the boiler, and one or more flanged perforated can-holding cups depending from said cover, substantially as described.

In testimony whereof I affix my signature in presence of two witnesses.

HELEN L. SMITH.

Witnesses:
  FRED A. BRIGHTMAN,
  T. A. DECKER.